(12) United States Patent (10) Patent No.: US 12,677,157 B2
McLachlan et al. (45) Date of Patent: Jul. 7, 2026

(54) RADIO NETWORK PULSES FOR LOCATION VERIFICATION

(71) Applicant: Telefonaktiebolaget LM Ericsson (publ), Stockholm (SE)

(72) Inventors: Paul McLachlan, San Francisco, CA (US); Héctor Caltenco, Oxie (SE); Saeed Bastani, Dalby (SE); Fredrik Dahlgren, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 283 days.

(21) Appl. No.: 18/566,589

(22) PCT Filed: Jun. 16, 2021

(86) PCT No.: PCT/IB2021/055343
§ 371 (c)(1),
(2) Date: Dec. 1, 2023

(87) PCT Pub. No.: WO2022/263891
PCT Pub. Date: Dec. 22, 2022

(65) Prior Publication Data
US 2024/0259824 A1     Aug. 1, 2024

(51) Int. Cl.
H04W 16/14     (2009.01)
H04W 12/06     (2021.01)
     (Continued)

(52) U.S. Cl.
CPC ........... H04W 16/14 (2013.01); H04W 12/06 (2013.01); H04W 48/20 (2013.01); H04W 64/00 (2013.01)

(58) Field of Classification Search
CPC ..... H04W 16/14; H04W 12/06; H04W 48/20; H04W 64/00; H04W 4/70; H04W 4/021; H04W 12/08; H04W 12/63
See application file for complete search history.

(56) References Cited

U.S. PATENT DOCUMENTS 7,783,299 B2     8/2010  Anderson et al.
7,885,915 B2     2/2011  Parson et al.
     (Continued)

FOREIGN PATENT DOCUMENTS

EP          3243181 A1     11/2017
WO     2016/112052 A1     7/2016
WO     2017/053033 A1     3/2017

OTHER PUBLICATIONS

U.S. Appl. No. 18/566,609, PCT/IB2021/055342, Pending.
(Continued)

*Primary Examiner* — Khoa Huynh
(74) *Attorney, Agent, or Firm* — Nicholson De Vos Webster & Elliott LLP

(57)     ABSTRACT
A method for location verification service is implemented by a computing system. The method includes receiving a first request from a user device to access or modify a shared resource associated with a location area, sending a second request to transmitters near the location area to transmit a location code for the location area to the user device, receive the location code from the user device, verifying based on the location code that the user device is authorized to access or modify the shared resource, and processing the first request from the user device to access or modify the shared resource, in response to verification that the user device is authorized.

17 Claims, 10 Drawing Sheets

(51) Int. Cl.
  H04W 48/20  (2009.01)
  H04W 64/00  (2009.01)

(56) References Cited

U.S. PATENT DOCUMENTS

| | | | |
|---|---|---|---|
| 8,509,805 | B2 | 8/2013 | Anderson et al. |
| 9,832,648 | B2 | 11/2017 | Vanderhulst et al. |
| 10,142,774 | B2 | 11/2018 | Alsina et al. |
| 10,142,784 | B2 | 11/2018 | Holden et al. |
| 10,445,738 | B1 | 10/2019 | Waters et al. |
| 10,672,005 | B1 | 6/2020 | Hart et al. |
| 11,132,425 | B1 | 9/2021 | Cohen et al. |
| 2011/0218880 | A1 | 9/2011 | Hammad et al. |
| 2014/0040139 | A1 | 2/2014 | Brudnicki et al. |
| 2016/0019526 | A1 | 1/2016 | Granbery et al. |
| 2016/0162900 | A1 | 6/2016 | Dutt et al. |
| 2016/0248782 | A1* | 8/2016 | Troesch ................... G07C 9/20 |
| 2017/0091764 | A1 | 3/2017 | Lloyd et al. |
| 2017/0364918 | A1 | 12/2017 | Malhotra et al. |
| 2018/0293823 | A1 | 10/2018 | Gillot et al. |
| 2019/0122220 | A1 | 4/2019 | Phillips et al. |
| 2019/0205885 | A1 | 7/2019 | Lim et al. |
| 2019/0295088 | A1 | 9/2019 | Jia et al. |
| 2021/0142311 | A1 | 5/2021 | Sorbello |
| 2022/0027914 | A1 | 1/2022 | Connell et al. |
| 2022/0129903 | A1 | 4/2022 | Sambhar et al. |
| 2022/0198434 | A1 | 6/2022 | Tu |
| 2022/0391896 | A1 | 12/2022 | Lei et al. |
| 2023/0360028 | A1 | 11/2023 | Vora et al. |
| 2024/0179802 | A1* | 5/2024 | Li ......................... H04L 12/189 |

OTHER PUBLICATIONS

Alexandria White, "More than half of Americans now use contactless payments, according to Mastercard poll," 2020, 4 pages, downloaded from https://www.cnbc.com/select/mastercard-survey-contactless-payments/.

Ericsson AB, "10 Hot Consumer Trends 2030: The Internet of Senses," Dec. 2019, 16 pages, Ericsson ConsumerLab, downloaded from https://www.ericsson.com/4ae13b/assets/local/reports-papers/consumerlab/reports/2019/10hctreport2030.pdf.

Sarah Clark, "Contactless payments growth rate doubles in Nordic countries," 2020, 3 pages, downloaded from https://www.nfcw.com/2020/05/06/366460/contactless-payments-growth-rate-doubles-in-nordic-countries/.

Tamara E. Holmes, "Credit card market share statistics," 2019, 8 pages, downloaded from https://www.creditcards.com/credit-card-news/market-share-statistics/.

The Nilson Report, "Payment Card Fraud Losses Reach $27.85 Billion," 2019, 3 pages, downloaded from https://www.prnewswire.com/news-releases/payment-card-fraud-losses-reach-27-85-billion-300963232.html.

Alexandria White, "More than half of Americans now use contactless payments, according to Mastercard poll," 2020, 6 pages, downloaded from https://www.cnbc.com/select/mastercard-survey-contactless-payments/.

Tamara E. Holmes, "Credit card market share statistics," 2019, 9 pages, downloaded from https://www.creditcards.com/credit-card-news/market-share-statistics/.

The Nilson Report, "Payment Card Fraud Losses Reach $27.85 Billion," 2019, 4 pages, downloaded from https://www.prnewswire.com/news-releases/payment-card-fraud-losses-reach-27-85-billion-300963232.html.

* cited by examiner

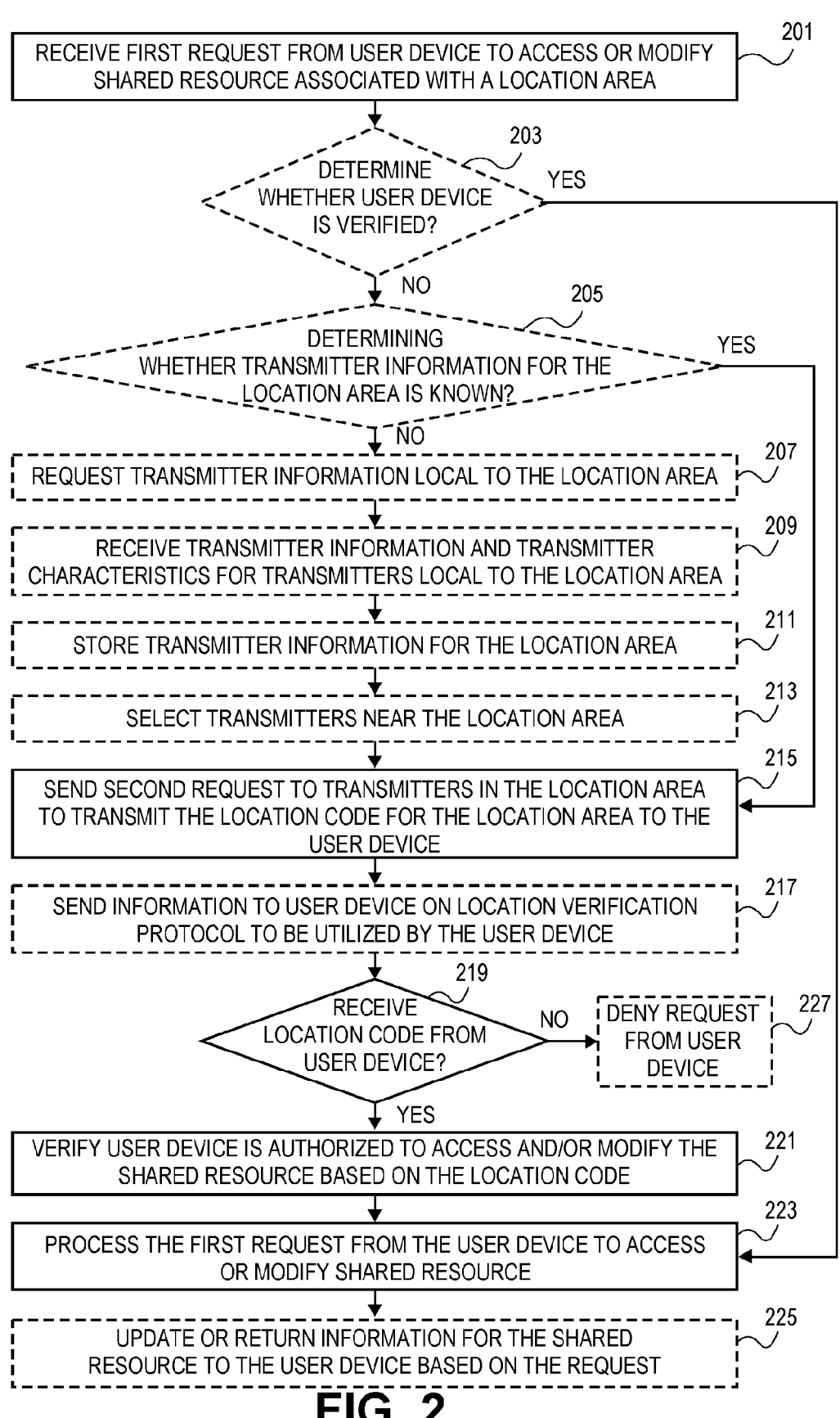

RECEIVE FIRST REQUEST FROM USER DEVICE TO ACCESS OR MODIFY SHARED RESOURCE ASSOCIATED WITH A LOCATION AREA — 201

DETERMINE WHETHER USER DEVICE IS VERIFIED? — 203    YES

NO

DETERMINING WHETHER TRANSMITTER INFORMATION FOR THE LOCATION AREA IS KNOWN? — 205    YES

NO

REQUEST TRANSMITTER INFORMATION LOCAL TO THE LOCATION AREA — 207

RECEIVE TRANSMITTER INFORMATION AND TRANSMITTER CHARACTERISTICS FOR TRANSMITTERS LOCAL TO THE LOCATION AREA — 209

STORE TRANSMITTER INFORMATION FOR THE LOCATION AREA — 211

SELECT TRANSMITTERS NEAR THE LOCATION AREA — 213

SEND SECOND REQUEST TO TRANSMITTERS IN THE LOCATION AREA TO TRANSMIT THE LOCATION CODE FOR THE LOCATION AREA TO THE USER DEVICE — 215

SEND INFORMATION TO USER DEVICE ON LOCATION VERIFICATION PROTOCOL TO BE UTILIZED BY THE USER DEVICE — 217

RECEIVE LOCATION CODE FROM USER DEVICE? — 219    NO    DENY REQUEST FROM USER DEVICE — 227

YES

VERIFY USER DEVICE IS AUTHORIZED TO ACCESS AND/OR MODIFY THE SHARED RESOURCE BASED ON THE LOCATION CODE — 221

PROCESS THE FIRST REQUEST FROM THE USER DEVICE TO ACCESS OR MODIFY SHARED RESOURCE — 223

UPDATE OR RETURN INFORMATION FOR THE SHARED RESOURCE TO THE USER DEVICE BASED ON THE REQUEST — 225

PHYSICAL DEVICES AND PHYSICAL CONNECTIVITY

NETWORK FUNCTION VIRTUALIZATION (NFV)

SPECIAL PURPOSE HARDWARE

SPECIAL PURPOSE NETWORK DEVICE 902

GENERAL PURPOSE (COTS) NETWORK DEVICE 904

HYBRID NETWORK DEVICE 906

VIRTUAL NETWORK ELEMENT(S)
930A ••• 930R

ND CONTROL PLANE 924

VIRTUAL NETWORK ELEMENT(S)
960A ••• 960R

922

962A    962R

NETWORKING SOFTWARE INSTANCE(S)

CONTROL COMMUNICATION AND CONFIG. MOD. 932A

932R

APP(S) 964A

APP(S) 964R

FORWARDING TABLE(S) 934A

934R

SOFTWARE INSTANCE(S)

952

VIRTUALIZATION LAYER 954

PROCESSORS 912

PROCESSOR(S) 942

910

FORWARDING RESOURCE(S) 914

940

PHYSICAL NIS 946

PHYSICAL NIS 916

NETWORKING HARDWARE

NON-TRANSITORY MACHINE READABLE STORAGE MEDIA 918

NETWORKING SOFTWARE 920

LOCATION VERIFICATION SERVICE 965

ND FORWARDING PLANE

926

HARDWARE

NON-TRANSITORY MACHINE READABLE STORAGE MEDIA 948

SOFTWARE 950

LOCATION VERIFICATION SERVICE 965

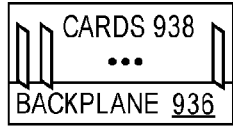

CARDS 938
•••
BACKPLANE 936

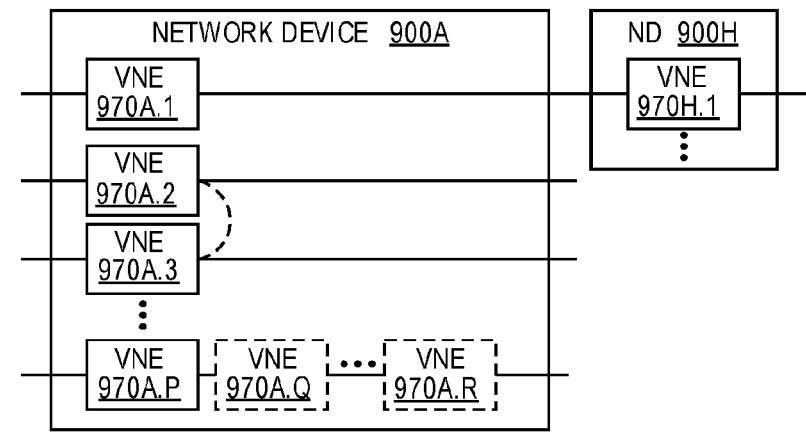

NETWORK DEVICE  900A

VNE 970A.1

VNE 970A.2

VNE 970A.3

VNE 970A.P    VNE 970A.Q  ...  VNE 970A.R

ND  900H

VNE 970H.1

FIG. 9D

CENTRALIZED APPROACH (SDN) 974

DISTRIBUTED APPROACH 972

...

APPLICATION(S) 988

APPLICATION LAYER 986

NORTH BOUND INTERFACE 984

VIRTUAL NETWORK(S) 992

CENTRALIZED CONTROL PLANE  976

NETWORK CONTROLLER 978

CENTRALIZED REACHABILITY AND FORWARDING INFO. MOD. 979

LOCATION VERIFICATION SERVICE 981

...

SOUTH BOUND INTERFACE 982

DATA PLANE 980

SINGLE VNE 970T

ND  900A

VNE 970A.1

ND  900H

VNE 970H.1

RADIO NETWORK PULSES FOR LOCATION VERIFICATION

CROSS-REFERENCE TO RELATED APPLICATIONS

This application is a National stage of International Application No. PCT/IB2021/055343, filed Jun. 16, 2021, which is hereby incorporated by reference.

TECHNICAL FIELD

Embodiments of the invention relate to the field of location verification; and more specifically, to the use of radio network signaling to verify the location of a user device.

BACKGROUND ART

Augmented reality (AR) augments the real world and the physical objects in the real world by overlaying virtual content. This virtual content is often produced digitally and may incorporate sound, graphics, and video. For example, a shopper wearing augmented reality glasses while shopping in a supermarket might see nutritional information for each object as they place it in their shopping cart. The glasses augment reality with information.

Virtual reality (VR) uses digital technology to create an entirely simulated environment. Unlike AR, which augments reality, VR immerses users inside an entirely simulated experience. In a fully VR experience, all visuals and sounds are produced digitally and do not include input from the user's actual physical environment. For example, VR may be integrated into manufacturing where trainees practice building machinery in a virtual reality before starting on the real production line.

Mixed reality (MR) combines elements of both AR and VR. In the same vein as AR, MR environments overlay digital effects on top of the user's physical environment. MR also integrates additional, richer information about the user's physical environment such as depth, dimensionality, and surface textures. In MR environments, the end user experience more closely resembles the real world. As an example, consider two users hitting a MR tennis ball on a real-world tennis court. MR incorporates information about the hardness of the surface (grass versus clay), the direction and force the racket struck the ball, and the players' height. Augmented reality and mixed reality are often used to refer to the same idea. As used herein, "augmented reality" also refers to mixed reality.

Extended reality (XR) is an umbrella term referring to all real-and-virtual combined environments, such as AR, VR and MR. XR refers to a wide variety and vast number of levels in the reality-virtuality continuum of the perceived environment, consolidating AR, VR, MR and other types of environments (e.g., augmented virtuality, mediated reality, etc.) under one term.

An XR device is the device used as an interface for the user to perceive both virtual and/or real content in the context of extended reality. An XR device typically has a display that may be opaque and displays both the environment (real or virtual) and virtual content together (i.e., video see-through) or overlay virtual content through a semi-transparent display (optical see-through). The XR device may acquire information about the environment through the use of sensors (typically cameras and inertial sensors) to map the environment while simultaneously tracking the device's location within the environment.

Object recognition in extended reality is mostly used to detect real world objects and for triggering the display of digital content. For example, a consumer can look at a fashion magazine with augmented reality glasses and a video of a catwalk event would play instantly. Sound, smell, and touch are also considered objects subject to object recognition. For example, a diaper advertisement could be displayed when a sound or mood of a crying baby is detected. Mood could be deduced from machine learning applied to the sound data.

SUMMARY

In one embodiment, a method for location verification service is implemented by a computing system. The method includes receiving a first request from a user device to access or modify a shared resource associated with a location area, sending a second request to transmitters near the location area to transmit a location code for the location area to the user device, receiving the location code from the user device, verifying based on the location code that the user device is authorized to access or modify the shared resource, and processing the first request from the user device to access or modify the shared resource, in response to verification that the user device is authorized.

In another embodiment, a machine-readable medium comprising computer program code which when executed by a computer carries out the method for location verification service is implemented by a computing system. The method includes receiving a first request from a user device to access or modify a shared resource associated with a location area, sending a second request to transmitters near the location area to transmit a location code for the location area to the user device, receiving the location code from the user device, verifying based on the location code that the user device is authorized to access or modify the shared resource, and processing the first request from the user device to access or modify the shared resource, in response to verification that the user device is authorized.

In a further embodiment, an electronic device implements a method for location verification service. The electronic device includes a non-transitory machine-readable medium having stored therein a location verification service, and a processor coupled to the non-transitory machine-readable storage medium, the processor to execute the location verification service. The location verification service receives a first request from a user device to access or modify a shared resource associated with a location area, sends a second request to transmitters near the location area to transmit a location code for the location area to the user device, receives the location code from the user device, verifies based on the location code that the user device is authorized to access or modify the shared resource, and processes the first request from the user device to access or modify the shared resource, in response to verification that the user device is authorized.

BRIEF DESCRIPTION OF THE DRAWINGS

The invention may best be understood by referring to the following description and accompanying drawings that are used to illustrate embodiments of the invention. In the drawings:

FIG. 2 is a flowchart of one embodiment of a process of an electronic device that implements the location verification service.

FIG. 9A illustrates connectivity between network devices (NDs) within an exemplary network, as well as three exemplary implementations of the NDs, according to some embodiments of the invention.

FIG. 9B illustrates an exemplary way to implement a special-purpose network device according to some embodiments of the invention.

FIG. 9C illustrates various exemplary ways in which virtual network elements (VNEs) may be coupled according to some embodiments of the invention.

FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9E illustrates the simple case of where each of the NDs implements a single NE, but a centralized control plane has abstracted multiple of the NEs in different NDs into (to represent) a single NE in one of the virtual network(s), according to some embodiments of the invention.

FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
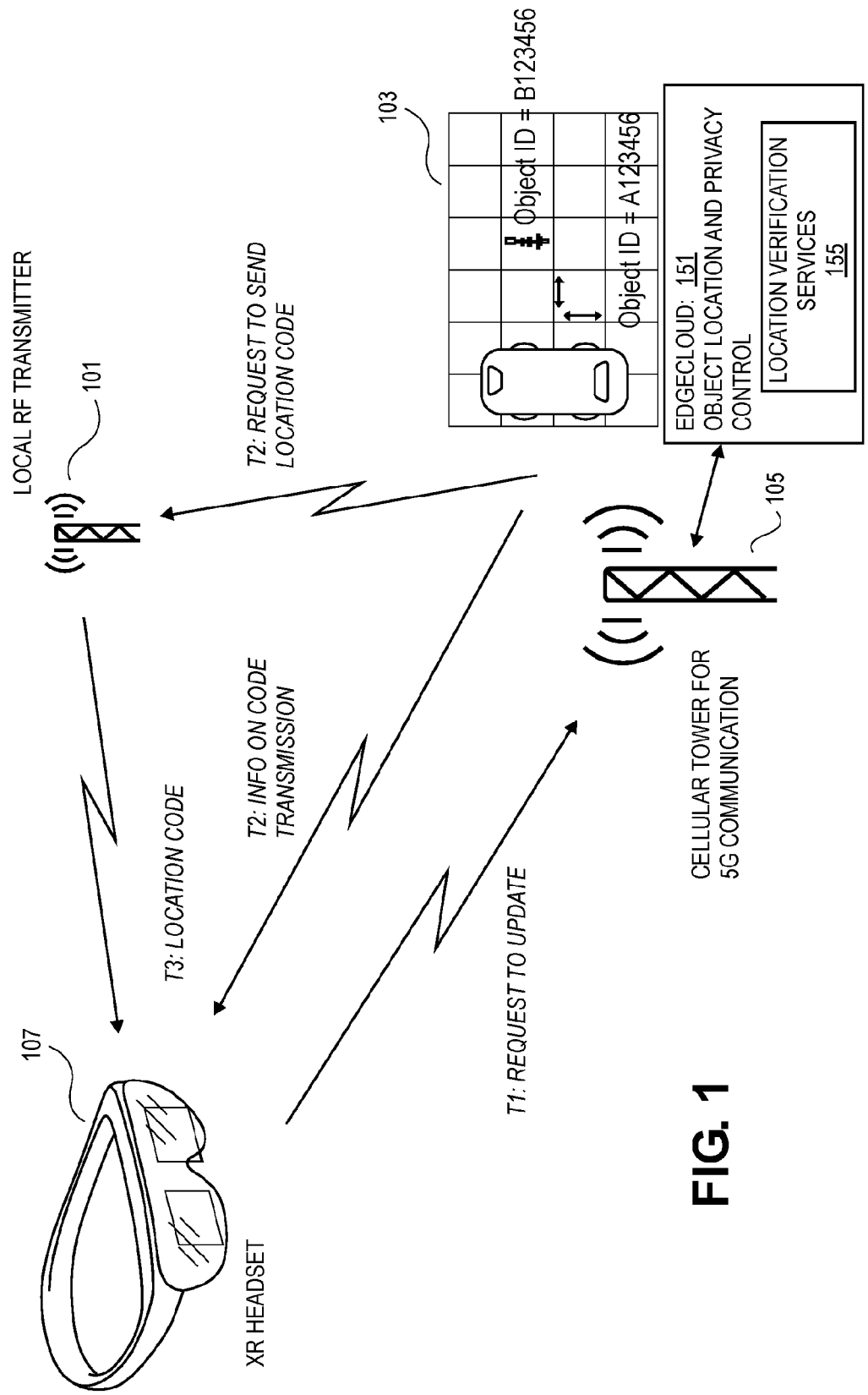
FIG. 1 is a diagram of one example embodiment of an example network implementing a location verification service.

The following description describes methods and apparatus for location verification services and systems. The location verification services and systems can verify the location of a user device that is seeking to access or modify a shared resource. The accessing of a shared resource can include the upload of data into a shared resource or a similar sharing of information (e.g., sharing information relevant to a spatial or semantic mapping of an extended reality (XR) service). Verifying the location of the user device ensures that only user devices that are at a location that they purport to be at are enabled to access or modify information that is being shared. This location verification can be utilized to enforce location based restrictions on the shared resource. For example, the location verification service can restrict access to XR spatial or semantic maps for a target location to those user devices that are verified to be located at or near that location. The location verification service utilizes nearby devices including transmitters of base stations and other user devices to transmit a temporary location identifier that the user device that is being verified must receive and provide to the location verification services. If the user device attempting to access the shared information is not in the target location, then it will not be able to obtain the location identifier and verify its presence.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other "Coupled" is used to indicate that two or more elements, which may or may not be in direct physical or electrical contact with each other, co-operate or interact with each other. "Connected" is used to indicate the establishment of communication between two or more elements that are coupled with each other.

There are many scenarios where users of communicatively connected devices may share resources or information with other users, services, network operators, or similar entities. This shared resource or information can be related to a location in which the user device is operating. A "shared resource," as used herein is any data, service, function, or similar component that may be utilized by other users or user devices either directly or indirectly including accessing components where the user or user device is the sole authorized user, but where other users may derive some data or use either at the same time or subsequently. For example, a user device could be sharing resources or information with a service that tracked business information and the user device can be providing an update on the location or products of that business. It would add an additional layer of security if the location of the user device at that business could be verified such that malicious or inaccurate information that is not collected at the relevant location could be excluded by the service that tracks the business information.

One example application of location verification services is in relation to extended reality (XR) services. XR services can incorporate aspects of the physical environment around a XR user device. Some XR use cases involve overlaying information and media in end users' field of view via an XR user device. Placing visual overlays in specific locations within the scene in an end user's field of view involves translating objects in the end users' environment into a three-dimensional map. These maps, referred to as "spatial maps," are three-dimensional (3D) representations of the environment and allow the XR device to interact with the real world. Spatial maps can be generated, augmented, and enriched more effectively using powerful compute clusters in an 'edgecloud.' An edgecloud as used herein refers to the compute resources in a network near the access points to that network (i.e., near the edge of the network). For example, mobile networks with radio access networks (RANs) can have compute resources proximate to base stations through which user devices connect to the mobile network.

XR services can be augmented by integrating semantic understanding of the environment about objects as a method of enriching spatial maps. Information of objects detected in the environment can be registered in the map, such as objects' location (latitude, longitude, and altitude), orientation (pitch, roll, yaw) and as well as their dimensions (width, depth, height) in the environment. Moreover, semantic understanding can also include qualitative information that describes objects' interrelation, use, and purpose Examples include objects' weight and density; how objects are grouped together; and potential configurations of the objects. This semantic information can be used to inform artificial intelligence systems for XR, such as overlay placement, self-driving vehicle and drone pathfinding, media recommendations, and digital advertising.

XR companies, content-creators, and end users themselves can generate spatial maps and contribute to the semantic understanding of their physical environment. In some cases, XR end users will exclusively use spatial maps created with their own XR headsets and augment them with their own semantic data. In other cases, users will share and collaborate on spatial maps and semantic understanding in real time. For example, sharing spatial map and semantic information can enable XR end users to access others' spatial maps upon entering a correlated physical environment, without having to generate a semantic map for that environment from scratch by spatially mapping the environment. Shared spatial maps and semantic information are also advantageous in highly dynamic environments where objects' locations change rapidly. For example, in a busy urban street scene, the location of buildings and other infrastructure do not move, but objects such as cars, pedestrians, and bicyclists change rapidly. Multiple users and XR user devices can collaborate and pool their various perspectives to build a complete spatial map of such dynamic environments. In addition to spatial mapping, the users and XR user devices can share semantic information. Depending upon the use case, end users can annotate and share their spatial maps with others; access third-party metadata; or download metadata curated by custodians of an environments such as in museums, historical districts, or parks.

As the above examples show, collaboration is advantageous for XR environments and XR user experience. However, such collaboration creates opportunities for malicious actors to upload inaccurate, fraudulent, or otherwise malicious data. For example, in order to reduce through traffic on their block, people might report non-existent road obstructions in their neighborhood. In a similar vein, households might report vertical obstructions over their communities to prevent drones and other unmanned aerial vehicles from passing overhead. In addition to diminishing XR end user experience, this type of inaccurate data could harm sustainability efforts by causing self-driving cars and drones to take slower or less efficient routes.

In cases like XR services, there is an opening for certain actors to act maliciously in one of two ways, 1) by providing false or inaccurate data, such as objects that do not exist in the real environment, and by 2) providing false access information, such as reporting incorrect location on the environment. In addition to deliberately sharing inaccurate data, malicious actors can upload harmful information into collaborative spatial maps or metadata. For instance, a malicious actor could push updates to communal metadata that all of a rival company's branches are permanently closed. In addition to creating bad data, updates of this type would affect recommendation engines and visual overlays. Malicious actors could falsely report a street is obstructed in front of a rival's location, causing traffic to be rerouted away from the impediment. While these malicious updates could be detected algorithmically, the risk of reverse engineering or attacks via sockpuppets and bots cannot be ruled out.

The above are examples of how bad and malicious data can affect collaborative spatial maps for XR services. Similar, but different, challenges exist in environments with curated spatial maps. As used herein, curated spatial maps and semantic information refer to contexts where an organization exerts editorial control over the objects and semantic information included in their location's spatial map. For example, art museums may replace audio tours with immersive XR experiences, such as visual overlays about the art. Artists may also create immersive experiences to accompany or be included with their artwork. Museums may choose to restrict access only to guests on the museum's premises. While these spatial maps would not allow collaborative updates, they are not immune from security risks. End users can spoof their location to gain access to the content or flood the system with false requests ("distributed denial of service" attacks or DDOS) to prevent the XR environment from operating properly.

Given these challenges, location verification can be a critical tool to minimize the types of attacks described above. As used herein, location verification refers to technical solutions to compare a user device's reported location against its true location. User devices can use global positioning systems (GPS) and cell tower triangulation for geolocation. However, reporting GPS and cell tower triangulation can be insufficient to prevent location-based fraud and malicious behavior. GPS is slow to locate, inaccurate without clear sightlines of the sky such as areas with skyscrapers, and easy to spoof. Cell tower triangulation is also slow and lacks sufficient precision to locate user devices within specific facilities such as museums. The embodiments provide a network-based location verification service and system that address these deficiencies.

The embodiments provide a network architecture that verifies the location of user devices (e.g., XR user devices) in a real-world physical environment. The embodiments provide location identifiers or similar codes via radio frequency (RF) transmitters as a basis to authenticate that the user devices that are used to access and/or modify the shared resources (e.g., spatial maps) correspond to the purported location of the user device seeking access or to modify the shared resource. For example, the embodiments support the use case where end users contribute to a shared resource (e.g., a spatial map), which involve the user device (e.g., XR user device) being able to: (1) request access to a shared resource (e.g., a spatial map) from a location in the network (e.g., stored in the edgecloud); (2) receive a location identifier (e.g., an RF transmission or RF 'pulse') from a nearby transmitter (e.g., nearby base stations) for purposes of location verification; and (3) be granted access to the shared resource after verification. As used herein, a 'base station' refers collectively to cell, transmission points, wireless transmitters, radio units, and similar components in a radio access network. As used herein, the term 'RF pulse' refers to any downlink RF signal sent by a base station, as defined above. Downlink signals can include cell specific reference signals, channel state information reference signals, signature sequences, positioning reference signals, and similar signals. XR environments and resources (e.g., spatial and semantic maps) are discussed herein by way of example application of location services and not by way of limitation. Those skilled in the art would understand that the location verification services are applicable to similar scenarios with shared resources that have location-based restrictions.

The prior art methods for location verification include using AI/machine learning models to filter data for quality and/or predict location and XR user devices that verify themselves by broadcasting a message to witness device(s) in order to verify their location. Each of these methods have deficiencies. In the AI case, various features of the physical environment and network are used to verify location data shared by XR user devices. While these processes improve data quality, they are not immune from location spoofing. In the XR user device broadcasting process, the XR user devices push communication to witness devices to verify their location. However, this requires the witness devices to have to receive and trust data from the broadcasting device opening a vector for use of malicious attacks on the witness devices or the use of a false witness device under the control of the same user for verification.

The embodiments overcome these limitations by having user devices (e.g., UEs) leverage determining their location via cell tower triangulation and an exchange of authentication messages between the user device and the cell tower. 5G technologies including small cells can be utilized to locate a user device within one meter. These technologies enable authentication to locate user devices in a smaller area to provide accurate information for the authentication process. The embodiments utilize local base stations and local transmitters to send a location identifier (e.g., authentication keys or similar location identifiers) to the user devices. The embodiments enable simultaneous verification of multiple devices as well as introduce the possibility of integrating multiple transmitters for supplementary verification. In some embodiments, transmitters are utilized to distribute location codes to multiple devices, which allow multiple devices to access the same shared resource or different shared resources.

The embodiments have advantages in providing a number of mechanisms and processes that do not exist in the art to provide authentication using location verification. The embodiments provide a process and mechanism for transmitters to distribute codes via pulses that are used to decrypt certain information. The embodiments provide a process and mechanism for transmitters to distribute location codes to multiple devices simultaneously for purposes of location verification. The distribution of location codes to multiple devices also reduces the latency of location verification. The embodiments can use signals sent from multiple transmitters to increase the trust in and precision of the location of a particular device. The embodiments can use pulses (e.g., RF pulses) to verify user device location for purposes of accessing shared resources (e.g., uploading spatial map data or semantic data for XR environments). The embodiments use pulses (e.g., RF pulses) to verify user device location to control access to protected content. The embodiments provide a process and mechanism to perform location verification using location identifiers (e.g., broadcast key distribution) without requiring individual user devices to perform handshaking with each other or the transmitters.

The location verification service can be utilized in combination with other technologies to enhance those technologies such as with extended reality (XR) systems. The location verification service can help XR to achieve its full potential by enabling end users to collaboratively update spatial maps and semantic information. Facilities may also choose to curate spatial maps or semantic information and make it available for a fee. Ensuring the quality of these data is critical for XR's commercial success. However, it is difficult to foresee many end users adopting a technology like XR that offers no information quality control. Methods to improve spatial maps' quality are also critical to support other use cases, including self-driving cars and drones.

The embodiments provide a network architecture that provides improved location verification that uses transmitted location codes to verify a user device's location. Since transmitters have limited range, only user devices that are located within that range will be able to receive the location codes (e.g., via a pulse) and hence have access to the correct location code. The range of distributed signals from transmitters varies according to the type of transmitter, output power, frequency, and communication standard (e.g., 3GPP version, Bluetooth, 802.11, and similar technologies all have different transmission capabilities.). The transmitter can be at a known location and connected to a location verification gateway that connects the transmitter with location verification services. In the embodiments, an edgecloud function of the location verification services requests the transmitters to distribute a location code (once or repeatedly), requests the user device to receive the location code, provides information on how to receive the location code (e.g., defining standard, frequency, timing, and similar characteristics for the location verification), and requests the user device to authenticate its position by using that location code.

The embodiments can utilize different types of transmissions for location codes, such as different types of transmissions that have different characteristics including differing ranges such as using transmitters that cover a city, or only a specific room. The embodiments can utilize transmissions with a known range or a range limited within a certain area. The embodiments prevent user devices from spoofing their location, ensuring that only authenticated devices in the target location will have access to the location code necessary for verification. The communication between the user device and the edgecloud and the mechanism to distribute the location code can be different and there can be several different options for each.

There are several different potential technologies for how to transmit the location code. In some embodiments, a Bluetooth transmitter (for very small areas), 4G, WiFi/802.11, 5G NR, or similar technologies can be utilized. The characteristics of these technologies in terms of availability and range differ, which is taken into account in the location verification service and system. Similarly, output power and beamforming can be utilized with these technologies to affect range in a known and controllable manner. In this regard, the location verification service provides the user devices the information on how and when to receive the location code depending on the available transmitters and their associated technology.

The embodiments divide physical space and corresponding representations thereof (e.g., spatial maps) into location areas. A location area is a three-dimensional unit whose metadata and description also contains the transmitters (e.g., cell towers and base stations) located within the area. The dimensions and characteristics of each location area can be affected by transmission power, beam direction, and similar parameters of the transmitters in the location area. Each location area is assumed to include at least one transmitter, which could be a cell phone tower, or similar transmitter. Every location area can be indexed by a unique alphanumeric identifier called a LocationAreaID, as discussed herein. In some embodiments, location areas can be assigned in areas without transmitters (e.g., cell towers) for data management, consistency, or similar purposes. The embodiments can begin operating in such areas when a transmitter becomes available there.

In some embodiments, where the location verification service is used with XR systems, spatial maps and semantic information may also be stored by location area such that end users can neither access nor update these fields unless they are located within the corresponding location area. The embodiments utilize the example application of location verification with XR system by way of example and not limitation. Those skilled in the art would appreciate that the principles, processes, and mechanisms described with relation to the application of location verification with XR system is applicable to other contexts.

A geographic area can be divided up into any number of location areas or sub-divisions thereof. In one example, a transmitter (e.g., a cell tower) can determine a root area ID, while the edgecloud will assign the underlying access points or wireless relay nodes regional IDs. The division of a geographical area into location areas with associated location identifier can be based on the number and distribution of transmitters in the vicinity. There is no standard size for a location area, and they can be flexibly scaled. For any location area to be functional, it must have at least one transmitter in that area such as a cell tower, a pico-base station, or similar transmitter. Without at least one transmitter in the area, there is no device that can send out a location code associated with that area. Any process for demarcating areas, assigning location identifiers, and similar definition of location areas can be utilized.

The embodiments utilize the location areas to verify that end user devices are located within a particular location area. Depending upon the embodiment, authenticated user devices will be able to perform various tasks, including accessing uploaded data into shared data sets (e.g., spatial maps, semantic data, and similar data). Accessing existing shared data can be restricted only to end user devices in the local area.

The embodiments of the location verification service and system guard against malicious data access or manipulation, and location fraud. This can be applied to any context. Applications for XR systems are provided by way of example. Two categories of malicious data access or manipulation involve false data and false access. In the first case, false data, end device users upload false or malicious shared data (e.g., spatial and/or semantic data). In the second case, false access, end user devices falsify or distort their purported location to access content to which they would not otherwise have access.

As used herein, false data refers to any attempt by end user devices to upload inaccurate data into a given location area's shared collaborative data (e.g., a spatial map or semantic information associated with the location). The location verification service and system provide a method to verify that user devices (e.g., XR headsets) are located within the location area whose shared resource (e.g., shared collaborative data like a spatial map) the user device is attempting to update By rejecting updates from user devices outside the location area, the location verification process and system make attacks such as using botnets to bias shared resources such as shared collaborative data (e.g., spatial maps) more difficult.

Examples of the malicious use of false data, e.g., false objects, which are reported objects that do not exist in reality show how false data can be used to attack route finding recommendation systems. In an XR system, if an end user has reported a false object in a road, then this false object causes route finding algorithms to believe the real world road is impassable and suggest a distorted path instead. Distortions from false data can have significant economic repercussions for the operation of the applications that rely on these data such as route finding applications, delivery services, and similar ventures. The distorted path caused by the false object not only increases travel distance, but it could also drive foot traffic away from businesses located along the true path. The distortions caused by false data could be intended to benefit businesses located along the distorted path and/or harm businesses along the true path.

In another example, false data can be utilized to distort a spatial map of a location area. In this example, an end user device creates a new object and uploads it into a spatial map of an XR system. This object is then assigned an ObjectID by the XR system and used for various mapping applications. In this example, however, this XR object does not represent an actual feature of the environment. If the false object is large, then the spatial map may treat the airspace around the false object as blocked, this would then be an example of a malicious datapoint that could cause drone traffic and routing guidance systems to follow inefficient paths around the location.

In a further example of malicious activity that the location verification process and system can mitigate. A user device may spoof its location. For example, the end user device could spoof a location of a museum. This may give the user device access to tours and visual overlays that are intended to be utilized only in the museum by the guests of the museum that have paid an entrance fee.

As mentioned, location areas can have any size or shape. Location areas are defined in three dimensional real world space. Suitable sizing of location areas improves the scalability and fine granularity of location verification processes in terms of differentiated verification policies. From a scalability perspective, assuming multiple transmitters are available in an area (e.g., a city), partitioning a big area to smaller areas and assigning each small area to at least one transmitter will decrease the latency of the location verification process (compared to one transmitter serving a large area with many users). Also, the partitioning to smaller areas (e.g., to landscape level) will allow for differentiation in location verification and make it possible to apply various level of verification policies for various areas. For example, for security critical areas (if partitioned carefully) the embodiments can apply more vigorous location verification compared to less critical areas and limit the user device to only access resources of the area but not modifying them. Therefore, depending on the use case, the size of an area can be as large as, for instance, a whole city or as small as a room in a building.

Every location area can be indexed by a unique alphanumeric identifier called a LocationAreaID. These are then stored in the edgecloud or in similar electronic devices. In some embodiments, location areas are cubes, where the shape is defined by the bottom left latitude, longitude, and altitude (in meters) and the top right latitude, longitude, and altitude (in meters). While there may be location areas of any shape or size, cubic location areas are provided by way of example.

TABLE I

| 001 | 001 | 00.0000 | 00001 | 00.0000 | 00.000 | 00001 | 00.0000 | 0001 |
|---|---|---|---|---|---|---|---|---|
| Private or public ID | Use Code | Latitude | Altitude | Longitude | Latitude | Altitude | Longitude | Checksum |

An example LocationAreaID is shown in Table I. In this example, the first three characters define whether the shared resource (e.g., spatial map) associated with that location area is private or public, e.g., whether end users must authenticate prior to accessing it. The use code is assigned by an application or service and indicates the shared resource (e.g., a spatial map) purpose, e.g., self-driving vehicles, advertising, or other usage. A first sixteen-digit latitude, a first sixteen-digit longitude, and a first altitude in meters can be used to define a first corner of a cubic location area, for example, the bottom left corner of the location area, e.g., the lowest in altitude, southmost, and westmost point of the cube. A second sixteen-digit latitude, a second sixteen-digit longitude, and a second altitude in meters are used to define a second corner of the cubic location area that is diametrically opposite of the first corner, for example, the top right corner of the location area, e.g., the highest in altitude, northmost, and eastmost point of the cube. The checksum validates the LocationAreaID. In this case, the resulting LocationAreaID is:

001001000000000000000000010000000000000000000000000000000000000001000000000000000000001.

The example description of a location area offered above via the LocationAreaID assumes a regular shape, such as a cuboid or a cube. Other formats or information can be included where a different shape is utilized. In some embodiments, the location area can be centered around a transmitter. In other embodiments, the location area can be defined as part of a larger pattern or scheme even where no transmitter is present. In some embodiments, location areas will be shaped to match the associated transmitters' coverage areas. As coverage depends upon line of sight, it is possible that location areas will have irregular shapes. In some cases, operators can either smooth irregular location areas into regular shapes or assign coordinates without network coverage to a location area. Further, it is also possible that operators will pre-define location areas and their attributes (such as shape and coordinates) without consideration for signal characteristics.

In some embodiments, location areas can be pre-defined and do not change unless the operator updates their boundaries. In other embodiments, operators can use artificial intelligence (AI), machine learning, or similar processes to update area boundaries dynamically. In one example, operators can use AI to optimize size and placement of location areas, especially in areas with moving objects such as people or cars. In some embodiments, location areas are used to uniquely identify a geographic location, rather than the behavior of transmitters inside that location area.

Mobile networks (e.g., cellular networks) often have a non-uniform distribution of transmitters. Some geographic areas have no transmitters and therefore no coverage, while other locations have multiple transmitters. The embodiments are primarily directed to those cases where network coverage exists in a given geographic area. Further, location areas can overlap in practice and multiple transmitters can receive the same information from the user device. This can be handled by allocating a session identifier (ID) to the ongoing interaction of the transmitter who initiated position verification and the user device. When the user device replies to the transmitter(s) it appends the session ID to its reply. Using this session ID, the transmitters will know which transmitter should proceed with the position verification.

FIG. 1 is a diagram of one example embodiment of a network that implements location verification. In the example network, a user device 107 (e.g., an XR headset) is in communication with a network implementing the location verification process via base station 105 or similar access point. The base station 105 can be communicatively coupled with resources of the edgecloud where a shared resource 103 is maintained (e.g., a spatial map for an XR system). The edgecloud can also be in communication with other transmitters 101 in the vicinity of the user device 107. The illustrated network is provided by way of example and not limitation. Intermediate electronic devices, communication links, and similar component are not shown for sake of clarity and conciseness.

The basic flow of the location verification process is shown with relation to the example network. In the illustrated example, the user device 107 is attempting to provide an update of information for the shared resource 103 (e.g., a spatial map for an XR system). The user device 107 sends a first request to update to the base station 105 that is currently providing connectivity and servicing the user device 107. The base station 105 forwards this request to the location verification services 155 at the edgecloud 151 which are triggered (at T1) to verify that the user device 107 is in a location that it indicates it is in and that a device in that location is allowed to provide updates for the identified shared resource 103. The location verification services 155 can be triggered when the user device 107 sends a first request identifying the shared resource 103 that it seeks to access and/or modify via the base station 105. The location verification services 155 identify a transmitter 101 in the location area that is associated with the shared resource 103. The location verification services 155 request (at T2) that the transmitter 101 (e.g., a local RF transmitter) transmits to the user device 107 a location code for the location area of the transmitter 101. In some embodiments, characteristics of the transmission can be specified including output power (to control the range), beamforming direction, and similar characteristics. The location verification services 155 can also notify the user device 107 (at T2) of the method or type of communication to expect from the transmitter 101 so that the user device 107 is prepared to receive it. The user device 107 then receives that location code, which can then be returned to the edgecloud and the location verification services 155 to verify that the user device 107 is in the location area identified by the location code.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 2 is a flowchart of one embodiment of a process of the location verification service. The process of the location verification service can be implemented at the edgecloud or similar location with computing resources that can execute the process. The process can be initiated in response to receiving a first request, e.g., via a base station, for a connected user device to access and/or modify a shared resource (Block 201). The shared resource is associated with a particular location (e.g., a location area with a Location-AreaID). The location verification service checks whether the user device that sent the first request has already been verified as authorized to access and/or modify the shared resource (Block 203). If the user device is already verified, then the first request to access or modify the shared resource is processed by the location verification service (Block 223). The location verification service can then update or return requested information for the shared resource based on the first request of the user device (Block 225).

If the user device has not been verified, then a check can be made whether transmitter information for the location area identified by the first request is known to the location verification services and/or edgecloud processes that manage the shared resource (Block 205). If transmitter information for the location area is known, then the location verification service can proceed with sending second requests to the transmitters in the location area to transmit a location code for that location area to the user device using any transmission technology supported by the transmitters and the user device (Block 215). The location verification process then continues to verify the user device by notifying, e.g., via a base station, the user device of the location verification protocols to utilize (e.g., the type of transmission to expect from the transmitters in the location area) (Block 217). In cases where there may be overlapping coverage of the transmitters in the location area, this can be resolved via binding a unique session identifier to ongoing interactions between the user device and the transmitters. If the user device provides the location code for that location area, e.g., via a base station, to the location verification services (Block 219), then the user device is verified (Block 221) as authorized to access and/or modify the shared resource associated with the location area, and the first request is processed by the location verification service (Block 223). If the user device fails to provide the proper location code, then the first request can be denied (Block 227). In some embodiments, the user device can also be flagged, an administrator notified, and/or a similar action is performed to record the failed attempt to access or modify the shared resource. If the first request is processed, then the results of the first request can be returned to the user device (Block 225), e.g., via a base station.

If the transmitter information for the location area identified by the first request is not known, then the location verification service can request transmitter information for the location area (Block 207). The transmitter information can be requested of other edgecloud services, core network services, or similar resources within the network or in communication with the edgecloud. The location verification service receives the transmitter information and characteristics for transmitters local to the location area (Block 209). The transmitter information characteristics can include information about the technologies and protocols supported by those transmitters. The transmitters can be any device capable of sending the location code within a target location area. The transmitters can be fixed devices in the infrastructure of the network architecture (e.g., base stations) or any device that has been verified with the location verification service. A verified device in this context has known transmission characteristics such as transmission range that correlates with the location area. This transmitter information can then be stored at the edgecloud or in a location accessible to the edgecloud and the location verification service so that it can be reused for future request processing (Block 211). The location verification services can then determine which technologies and protocols supported by the transmitters are also supported by the requesting user device to select which transmitters, technologies and protocols to use for the location verification (Block 213).

After the transmitter selection, the location verification process then sends second requests to the selected transmitters to transmit the location code for that location area to the user device using the selected technologies/protocols (Block 215) and starts to verify the user device by notifying, e.g., via a base station, the user device of the location verification protocols to utilize (e.g., the type of transmission to expect from the transmitters in the location area) (Block 217). If the user device provides the location code for that location area, e.g., via a base station, to the location verification services (Block 219), then the user device is verified (Block 221) as authorized to access and/or modify the shared resource associated with the location area, and the first request is processed by the location verification service (Block 223). If the user device fails to provide the proper location code, then the first request can be denied (Block 227). In some embodiments, the user device can also be flagged, an administrator notified, and/or a similar action is performed to record the failed attempt to access or modify the shared resource. If the first request is processed, then the results of the first request can be returned to the user device (Block 225), e.g., via a base station.

The location codes can be sent to user devices via radio frequency pulses (RFPs) as a token or certificate that the user devices use to access and/or modify the shared resource that corresponds to the user device locations. RFPs can be (typically short) electromagnetic signals emitted from a transmitter that is already installed in the environment (e.g., the ceiling, for line of sight transmissions) and whose location is verified. RFPs are a sequence that are either randomly generated or generated using clues from the environment. Pulse transmissions are calibrated such that they can only be received within a pre-defined radius. Using beamforming, transmission power adjustment, or time of flight (signal airtime), the area where these pulses are sent can be controlled. Base stations can transmit RFPs in a broadcast/multicast fashion. When compared to other verification methods, such as sending tokens via email or linking to token files, using RFPs facilitates token distribution and end user authentication.

In some embodiments, additional mechanisms can be utilized to counteract the spoofing or deliberate sharing of the location code received by user device A with another unauthorized device B. One counteracting mechanism could be binding the location code to some other device-specific or device connection-specific ID (created via hashing the location code and the additional device/connection ID) so that another unauthorized device B with a different ID could not use the location code assigned to authorized device A. This way, an additional protection is achieved since the location code can be associated with the duration of device connectivity and expire as soon as the authorized device disconnects. In another embodiments a second mechanism is to mandate an additional step of position verification of the communicating user device, for example, using an uplink-based positioning scheme. But since this can impose additional cost to the device (energy and latency), a tradeoff could be to run uplink positioning only occasionally and after random time periods during device connectivity (or after transmission of random number of packets).

The embodiments can be utilized in conjunction with other services, such as XR systems. The embodiments can help XR applications to achieve stronger protection using information about users'/user devices' physical locations. Binding the access of users and user devices to spatial maps to their incident locations helps reduce malicious cyber-attacks and manipulation of spatial maps remotely at irrelevant locations. The RF pulse-based verification has several advantages compared to alternative approaches including the reduced time spent by users for verification and the ubiquity of RF transmission infrastructure. Also, the technology exists (and continues evolving) for calibrating signal propagation pattern so that it can be roughly restricted to certain ranges and directions, so that users outside a given location will find it hard, if not impossible, to decode RF signals.

Other types of location confirmation by the infrastructure (base stations) might have different aims (e.g., emergency location) and would depend on several factors. In contrast, the embodiments scale with purpose by using other types of RF transmitters where needed. User device centric positioning technologies might yield adequate accuracy, however there would be no guarantee that the user device is actually where it purports to be.

Figure 3:
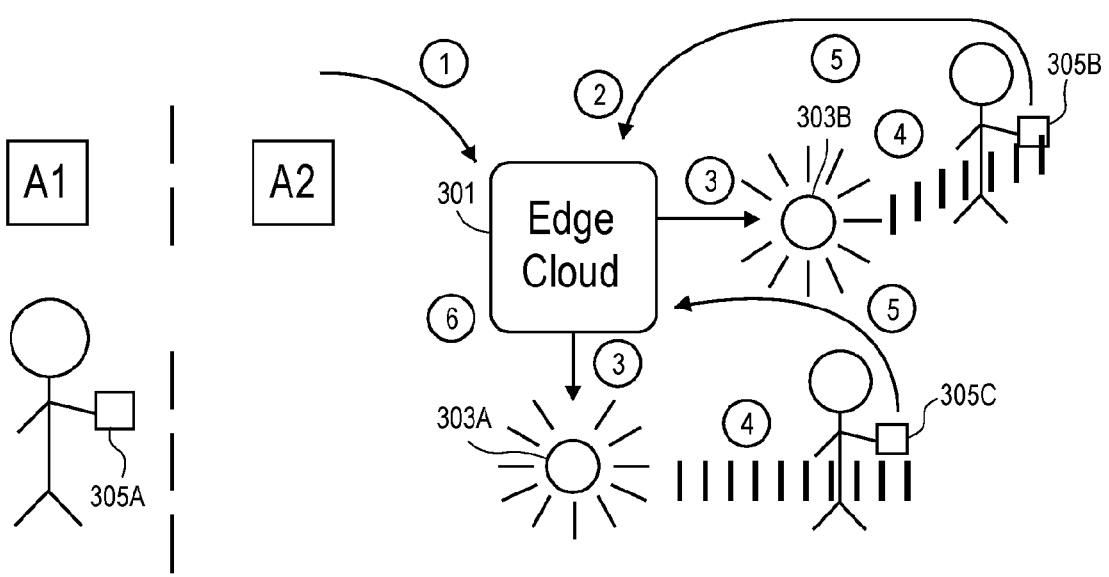
FIG. 3 is a diagram of one example embodiment of an application of the location verification service.

FIG. 3 is a diagram of one embodiment of an example application of the location verification process. In this embodiment, the location verification services can verify the location of user devices such that they can access shared resources such as spatial maps and semantic data held by third parties. In this example embodiment, a user device that is located in location area A2 may access the shared resource while those located in location area A1 may not because they are outside of the relevant location area.

In this example, in step 1 an authenticated third-party uploads a shared resource such as proprietary spatial maps or semantic information into the edgecloud 301. In the same step 1, the user device 305A can attempt to use the location verification process described herein to verify its location (i.e., in location area A1) and ensure any data that is uploaded to the edgecloud 301 is true and faithful to that location area. However, since user device 305A is in location area A1 this verification would fail and deny user device 305A access to shared resources associated with other location areas (e.g., shared resources of location area A2). In step 2, a different end user device 305B or 305C in location area A2 requests access to the shared resource stored in the edgecloud 301. Upon receiving the request, e.g., via a base station, the location verification service in the edgecloud 301 then asks cell phone towers (or similar transmitters 303A and 303B) in its coverage area (i.e., in location area A2) to send RF pulses (i.e., a location code) according to its preferred encryption scheme and technologies (step 3). These pulses are then received by the user device 305B or 305C (step 4) and the code is returned, e.g., via a base station, to the edgecloud 301 by the user device 305B or 305C (step 5). The end user 305B or 305C is then granted access to the underlying shared resource (e.g., spatial map or semantic information) in the edgecloud 301 (step 6).

Figure 4:
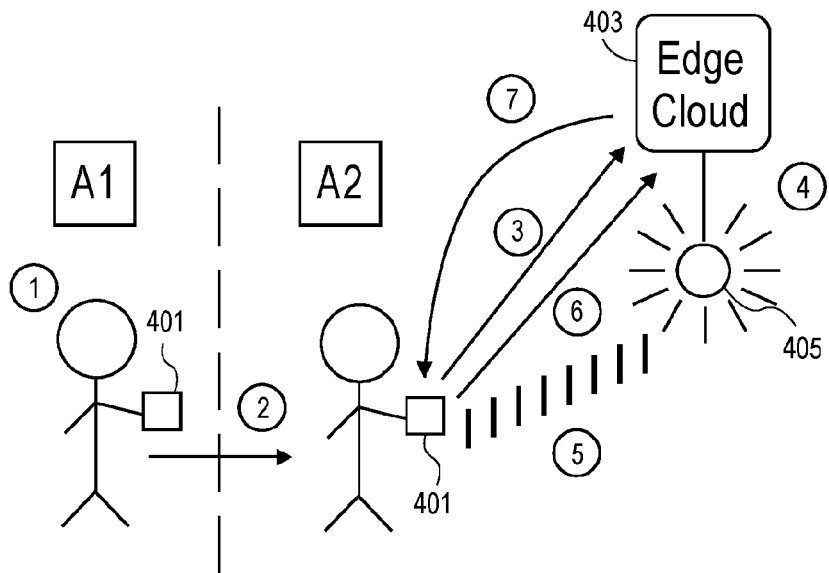
FIG. 4 is a diagram of another example embodiment of an application of the location verification service.

FIG. 4 is a diagram of one embodiment of another example application of the location verification process. In this example embodiment, the location verification services enable the verifying of the location of user devices 401 such that it can push updates from locations A1 and A2 into the shared resource (e.g., a spatial map) stored in the edgecloud 403. In this example, a user device 401 moves from location area A1 into location area A2 and must verify its new location. RF pulses are used to authenticate the user device's 401 location in location area A2. In (step 1), an end user 401 begins uploading data (e.g., spatial map or semantic data) while in location area A1. In (step 2), the end user leaves location area A1 where their location had been authenticated and enters a new area, location area A2. The end user then attempts to upload new data into the edgecloud 403 (step 3), which requires their location to be verified. In order to verify the end user's 401 location, the location verification services of the edgecloud 403 asks cell phone towers (or similar transmitters 405) in the location area A2 to send RF pulses (or similar location code) according to its preferred encryption and technology scheme (step 4). These pulses (and location code) are then received by the user device 401 (step 5) and the location code is returned, e.g., via a base station, to the edgecloud 403 (step 6). The resulting data is then accepted by the edgecloud and a confirmation may be sent, e.g., via a base station, to the user device 401 (step 7).

In some embodiments, there are multiple local transmitters in the vicinity of the user device that can be utilized to further enhance the robustness of the location verification process. An example is when a local transmitter is compromised and location verification relies on that single transmitter, this may lead to the failure of location verification. Also, in some cases a single transmitter cannot reach a user device at a given time instance (e.g., because of radio shadowing). In these cases, multiple local transmitters can be used simultaneously to distribute the location code to the user. In these cases, the mechanism for the distribution of the location code can be further optimized by, for instance, sending part of the location code from each transmitter and combining them in the user device. In some embodiments, this combination and division of the location codes can be tailored to network coding. In another embodiment, each local transmitter sends redundant location codes and the user device checks if they all match.

In some embodiments, the location verification services can be configured to prevent malicious users from using a relay node in between the user device and the transmitter. A relay node could be utilized by malicious users to receive the RF pulse from the transmitter and pass the location code to the user device whose location is attempting to be verified. After receiving this location code, the user device would be able to spoof its location using the codes received by the relay node. To circumvent this problem, the embodiments can impose maximum response times per verification request and to access services that require location verification. As each hop imposes latency, the time threshold should be set at a level such that a UE cannot rely upon relay nodes because their access to the service, gateway, or protocol will expire before it receives the relayed RF pulse code from the relay node. To account for link fluctuation, the RF transmitter can probe the user device several times and take the minimum latency of the response from the user device. Then the transmitter compares this delay to a threshold. If the difference is less than a given threshold, then the user device can be verified.

Figure 5:
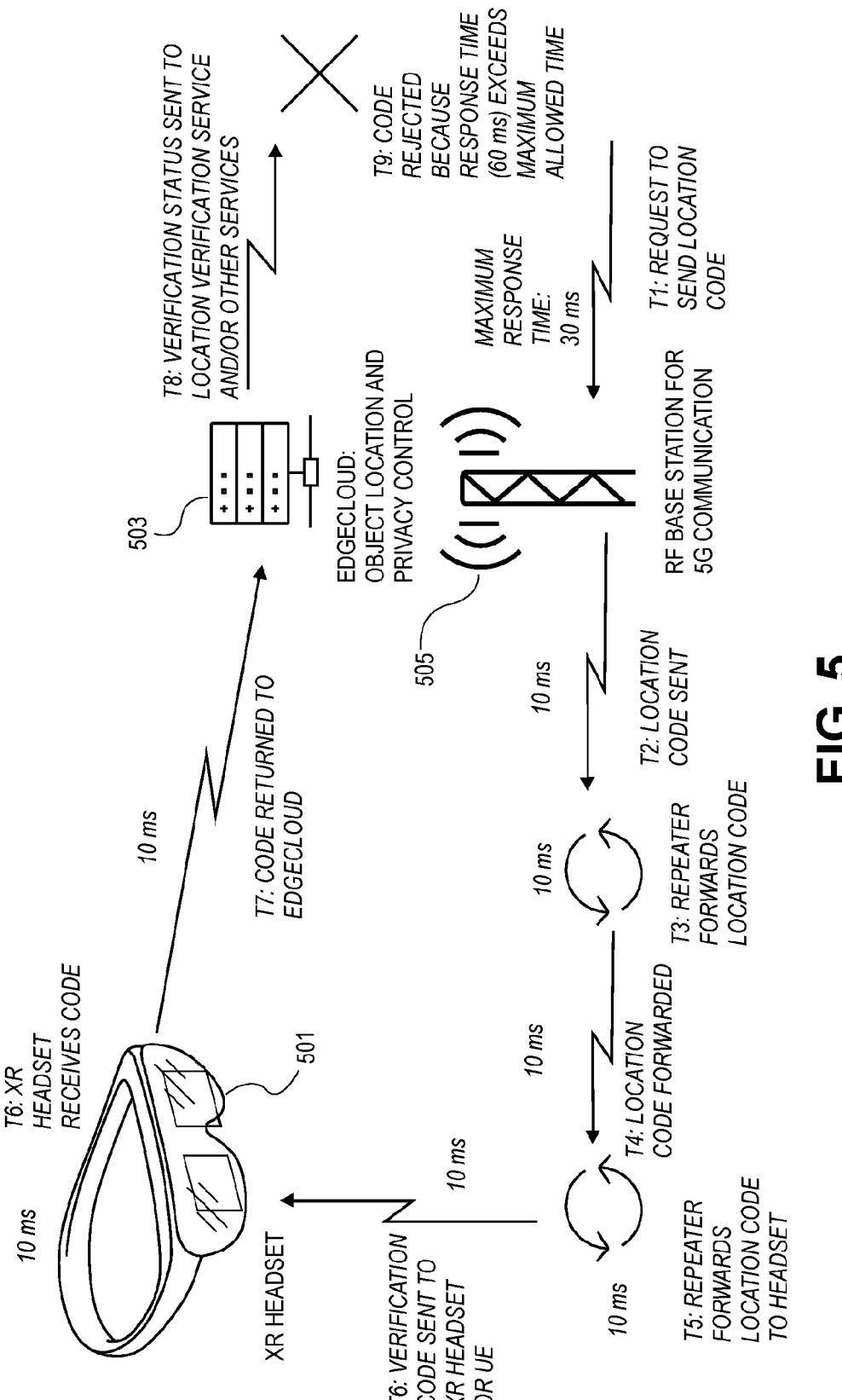
FIG. 5 is a diagram of one example embodiment of an example network implementing location verification that illustrates the timing of the location verification service.
Figure 6:
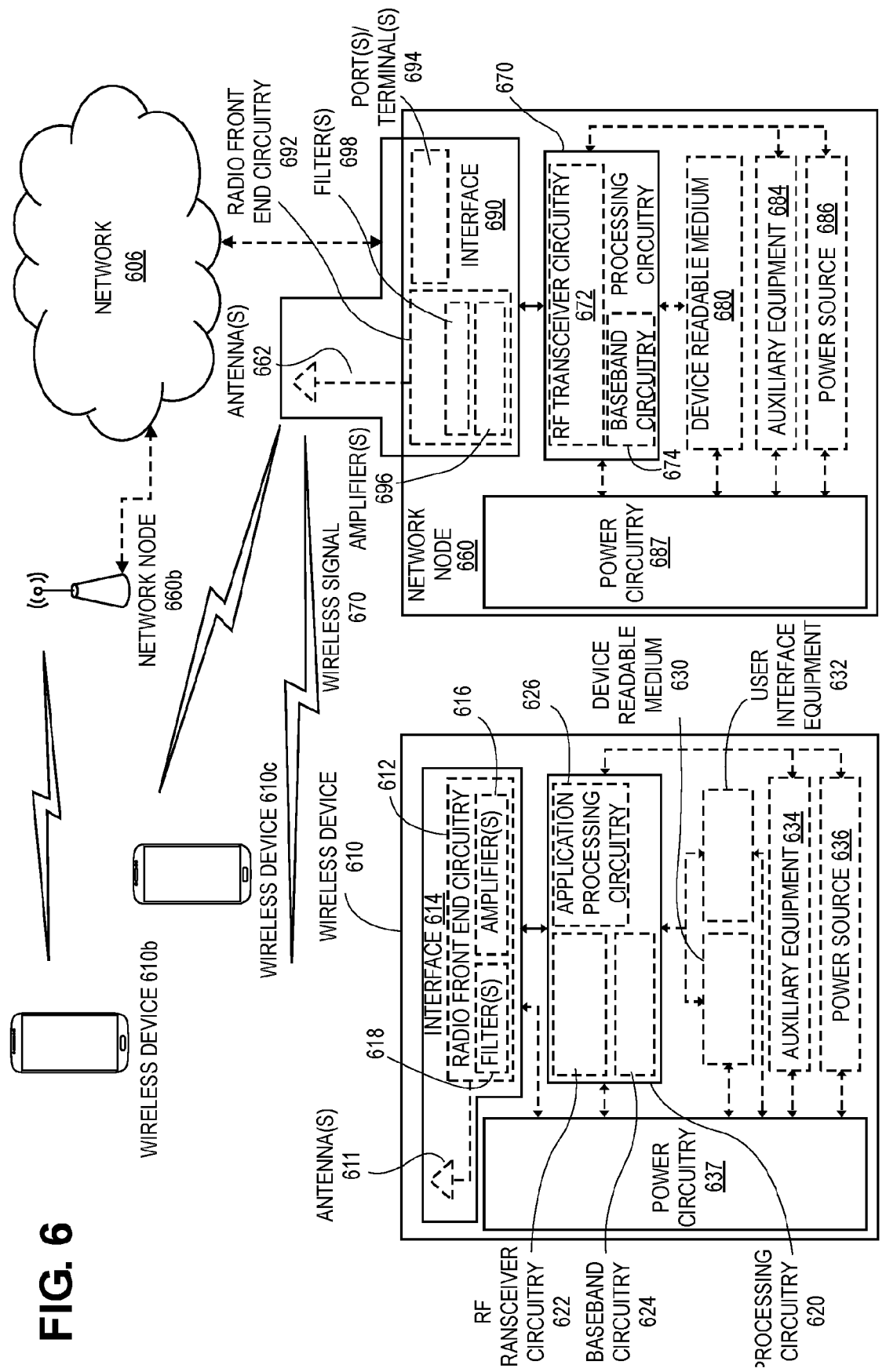
FIG. 6 is a diagram of one embodiment of a wireless network for supporting location verification services.
Figure 7:
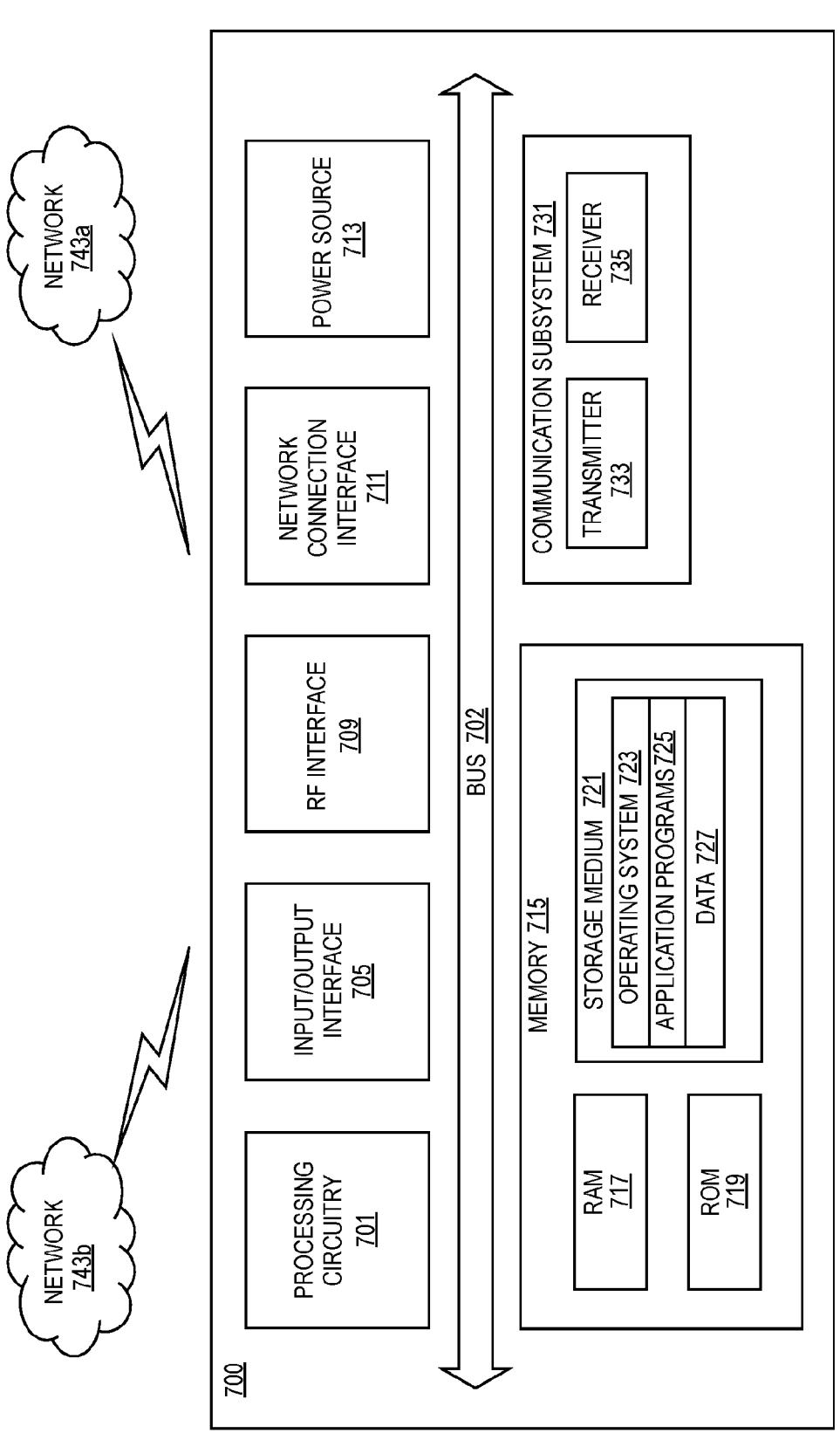
FIG. 7 is a diagram of one embodiment of user equipment for supporting location verification services.
Figure 8:
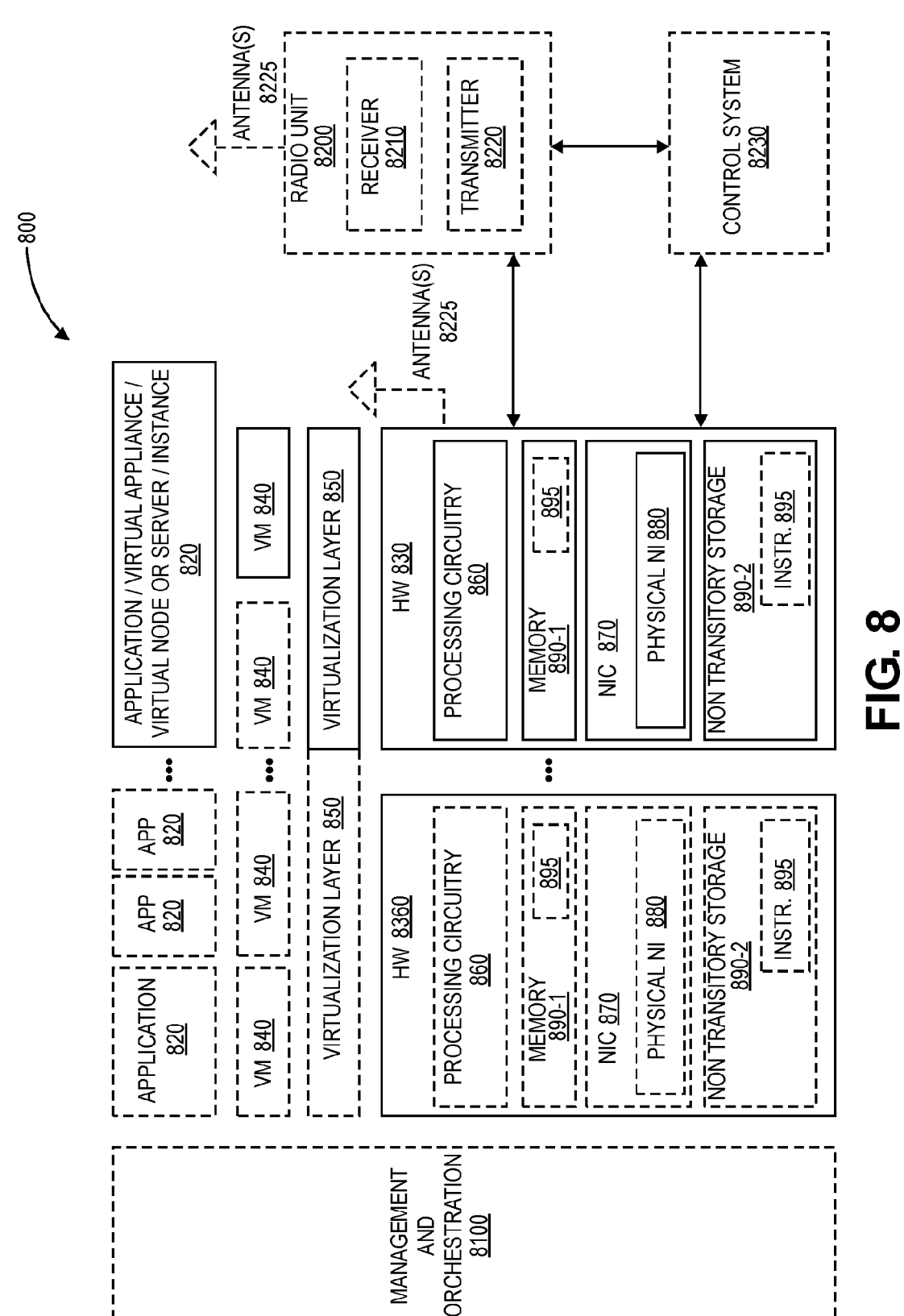
FIG. 8 is a diagram of one embodiment of a virtualization environment for supporting location verification services.

FIG. 5 is a diagram of one example embodiment where time restrictions are enforced by the location verification service. In this example, a request is sent to a local transmitter 505 to send a location code to the user device 501 (at T1). In this example, the code is sent (at T2) and received by an intermediate node or repeater. The repeater sends (at T3) the location code to another repeater, which receives it (at T4). The second repeater sends (at T5) the location code to the user device 501. The user device 501 then receives (at T6) and returns, e.g., via a base station, (at T7) the location code to the location verification services at the edgecloud 503. Verification status is sent (at T8) by the edgecloud 503 using any intermediate communication protocols or services. The location verification services reject (at T9) the access request because the delay exceeds a threshold due to the added time delay of the repeaters. Even though repeaters are able to access the location code (at T2-T4) and send it to a user device located outside of the intended location area, the amount of time it takes (60 ms) exceeds the maximum allowed by the system (30 ms). The location code, therefore, is rejected.

Even when time limits are imposed and the system can be entirely sure about the user device's verified presence in a given location area, it does not necessarily grant the end user access to the desired service. Any additional protocols to access the service e.g., via payment, subscription, or other process can be amployed in combination with the location verification service.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a special-purpose operating system (OS); and 2) a general purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

The networking software 920 can include the location verification services 965 as described herein. The location verification services to verify a location of a user device as being in a designated location area to control access or modification of shared resources.

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and physical NIs 946, as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The software 950 can include the location verification services 965 as described herein. The location verification services to verify a location of a user device as being in a designated location area to control access or modification of shared resources.

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the processor(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

The centralized control plane 976 can include the location verification services 981 as described herein. The location verification services to verify a location of a user device as being in a designated location area to control access or modification of shared resources.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/ VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
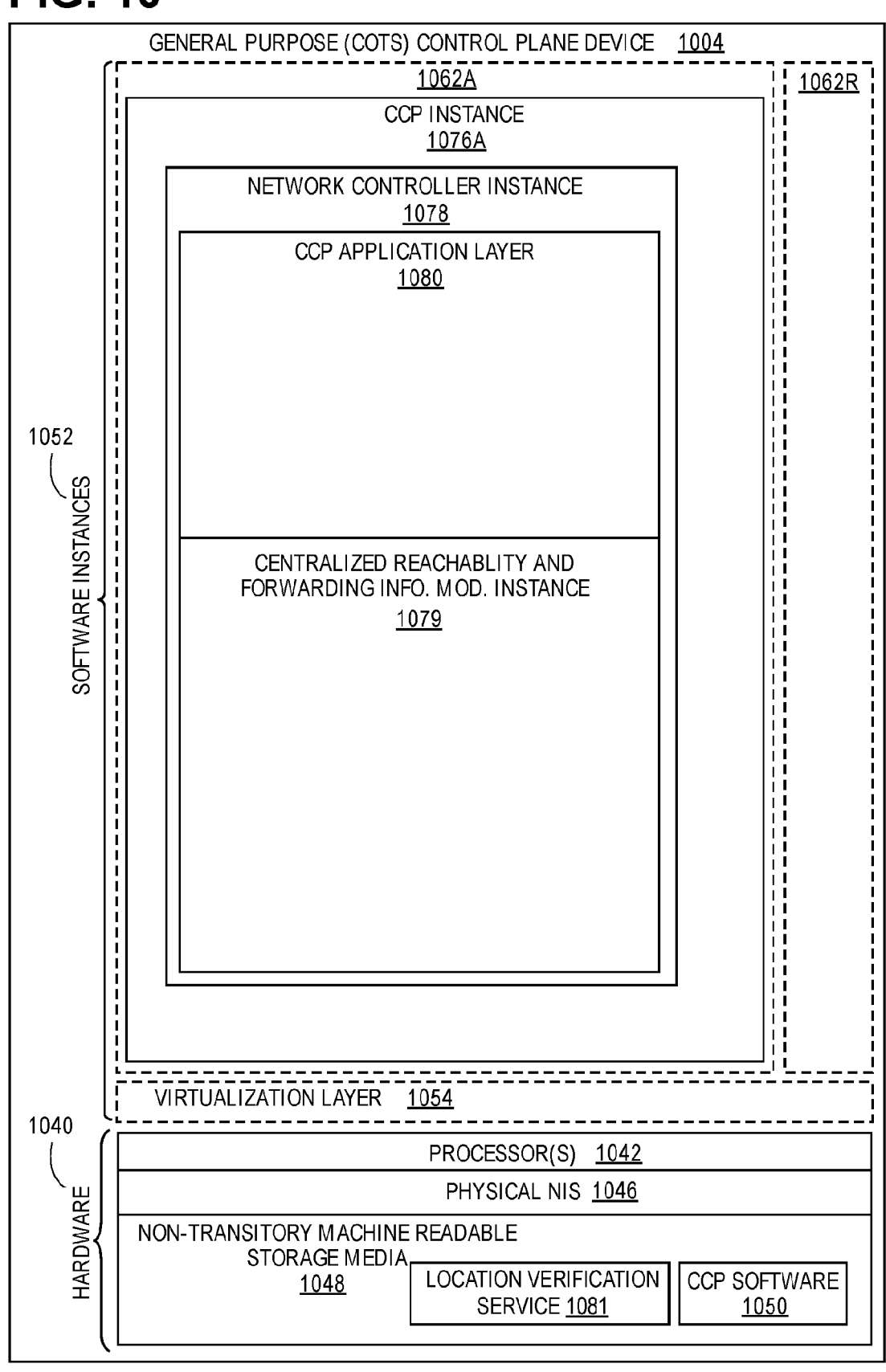
FIG. 10 illustrates a general purpose control plane device with centralized control plane (CCP) software 1050), according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and physical NIs 1046, as well as non-transitory machine readable storage media 1048 having stored therein centralized control plane (CCP) software 1050.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user—interfaces). At a more abstract level, this CCP application layer 1080 within the centralized control plane 976 works with virtual network view(s) (logical view(s) of the network) and the middleware layer provides the conversion from the virtual networks to the physical view.

The non-transitory machine readable storage medium 1048 can include the location verification services 1081 as described herein. The location verification services to verify a location of a user device as being in a designated location area to control access or modification of shared resources.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NF/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for location verification service implemented by a computing system, the method comprising:
   receiving a first request from a user device to access or modify a shared resource associated with a location area;
   requesting transmitter information local to the location area;
   selecting transmitters near the location area to transmit a location code;
   sending a second request to the transmitters near the location area to transmit the location code for the location area to the user device;
   receiving the location code from the user device;
   verifying based on the location code that the user device is authorized to access or modify the shared resource; and
   processing the first request from the user device to access or modify the shared resource, in response to verification that the user device is authorized.

2. The method of claim 1, further comprising:
   sending information to the user device to indicate a location verification protocol to be utilized by the user device.

3. The method of claim 1, further comprising:
   determining whether transmitter information for the location area is known; and
   utilizing locally cached transmitter information for sending the second request to the transmitters, in response to determining transmitter information for the location area is known.

4. The method of claim 1, wherein the transmitters are a plurality of base stations adjacent to the location area.

5. The method of claim 1, wherein the transmitters include at least one verified device in the location area.

6. The method of claim 1, wherein verifying that the user device is authorized further comprises:
   determining whether the location code is received within a maximum allowed time frame.

7. The method of claim 1, wherein the transmitters include a plurality of transmitters with different ranges that correlate with different regions of the location area.

8. The method of claim 1, wherein overlapping coverage of the transmitters is resolved via binding unique session identifier to ongoing interactions between the user device and the transmitters.

9. A non-transitory machine-readable storage medium having stored therein computer program code which, when executed by a computer, causes the computer to perform a set of operations comprising:
   receiving a first request from a user device to access or modify a shared resource associated with a location area;
   requesting transmitter information local to the location area;
   selecting transmitters near the location area to transmit a location code;
   sending a second request to the transmitters near the location area to transmit the location code for the location area to the user device;
   receiving the location code from the user device;
   verifying based on the location code that the user device is authorized to access or modify the shared resource; and
   processing the first request from the user device to access or modify the shared resource, in response to verification that the user device is authorized.

10. The non-transitory machine-readable storage medium of claim 9, wherein the computer program code further causes the computer to perform operations comprising:
   sending information to the user device to indicate a location verification protocol to be utilized by the user device.

11. The non-transitory machine-readable storage medium of claim 9, wherein the computer program code further causes the computer to perform operations comprising:
   determining whether transmitter information for the location area is known; and
   utilizing locally cached transmitter information for sending the second request to the transmitters, in response to determining transmitter information for the location area is known.

12. The non-transitory machine-readable storage medium of claim 9, wherein verifying that the user device is authorized further comprises:
   determining whether the location code is received within a maximum allowed time frame.

13. An electronic device comprising:
   a storage medium having stored therein a location verification service; and
   a processor coupled to the storage medium, wherein the processor to execute the location verification service and the location verification service to:
      receive a first request from a user device to access or modify a shared resource associated with a location area;
      request transmitter information local to the location area;
      select transmitters near the location area to transmit a location code;
      send a second request to the transmitters near the location area to transmit the location code for the location area to the user device;
      receive the location code from the user device;
      verify based on the location code that the user device is authorized to access or modify the shared resource; and
      process the first request from the user device to access or modify the shared resource, in response to verification that the user device is authorized.

14. The electronic device of claim 13, wherein the location verification service is further to send information to the user device to indicate a location verification protocol to be utilized by the user device.

15. The electronic device of claim 13, wherein the location verification service is further to determine whether transmitter information for the location area is known, and utilize locally cached transmitter information for sending the second request to the transmitters, in response to determining transmitter information for the location area is known.

16. The electronic device of claim 13, wherein the transmitters are a plurality of base stations adjacent to the location area.

17. The electronic device of claim 13, wherein the transmitters include at least one verified device in the location area.

\* \* \* \* \*